United States Patent
Noma et al.

(10) Patent No.: US 6,229,720 B1
(45) Date of Patent: May 8, 2001

(54) PIEZOELECTRIC TRANSFORMER INVERTER

(75) Inventors: Takashi Noma, Moriyama; Yasuyuki Morishima, Kyotanabe, both of (JP)

(73) Assignee: Murata Manufacturing Co. Ltd. (JP)

( * ) Notice: Subject to any disclaimer, the term of this patent is extended or adjusted under 35 U.S.C. 154(b) by 0 days.

(21) Appl. No.: 09/535,892

(22) Filed: Mar. 27, 2000

(30) Foreign Application Priority Data

Apr. 9, 1999 (JP) .................................................. 11-102199

(51) Int. Cl.[7] .............................. H02M 1/12; H02M 7/00; H02M 3/335
(52) U.S. Cl. .............................. 363/40; 363/124; 310/318
(58) Field of Search ................................ 363/16, 40, 97, 363/131, 124; 310/318, 319

(56) References Cited

U.S. PATENT DOCUMENTS 5,739,679 * 4/1998 Takehara et al. ..................... 363/131
5,834,907 * 11/1998 Takehara ............................... 315/307
6,013,969 * 1/2000 Noma et al. .......................... 310/318

FOREIGN PATENT DOCUMENTS 6333695 12/1994 (JP) .............................. H05B/41/392
9073990 3/1997 (JP) ................................ H05B/41/29

* cited by examiner

Primary Examiner—Peter S. Wong
Assistant Examiner—Bao Q. Vu
(74) Attorney, Agent, or Firm—Ostrolenk, Faber, Gerb & Soffen, LLP

(57) ABSTRACT

A piezoelectric transformer inverter can suppress ripples generated by the oscillations of a transformer, and can reduce the possibility of occurrence of beats in the inverter. In this piezoelectric transformer inverter, a switching element is disposed at a stage before an inverter circuit driving a discharge tube, and the switching element is switched on and off by switching signals from a chopper-duty control unit. Then, an input voltage is converted into a rectangular-wave voltage having a chopper circuit frequency to be supplied to the inverter circuit, and a frequency of n times a driving frequency of the inverter circuit and a chopper frequency of the chopper circuit are set in such a manner that these two frequencies are not close to each other.

5 Claims, 6 Drawing Sheets

PIEZOELECTRIC TRANSFORMER INVERTER

BACKGROUND OF THE INVENTION

1. Field of the Invention

The present invention relates to piezoelectric transformer inverters, and particularly, the invention relates to piezoelectric transformer inverters used for lighting liquid-crystal-backlight cold-cathode tubes.

2. Description of the Related Art

In general, liquid crystal displays use a light source for displaying, since liquid crystal does not emit light A cold-cathode tube is used as a light source for a backlight. For example, Japanese Unexamined Patent Publication No. 7-220888 describes a discharge-tube driving device formed by incorporating a piezoelectric transformer. In this device, a chopper circuit is disposed between an inverter circuit driving a cold-cathode tube used for a backlight and an input voltage terminal, and the duty of the chopper circuit is controlled in such a manner that the tube current of the cold-cathode tube is maintained constant, by which the luminance of the backlight is maintained constant.

In the conventional art described in the above publication, however, since the output of the chopper circuit is set to be a DC voltage, the chopper circuit is required to be a DC—DC converter. In order to use the chopper circuit as a DC—DC converter, it is necessary to dispose an inductor and a capacitor used for smoothing and rectification. This leads to the increase of the number of components and loss.

In addition, Japanese Unexamined Patent Publication No. 9-107684 provides the structure of an inverter circuit having a frequency dimming function controlling such that a tube-current value is a desired value by using the frequency-gain characteristics of a piezoelectric transformer and a chopper circuit including no smoothing/rectifying components disposed at a stage before the inverter circuit. This arrangement permits an average input voltage to the inverter circuit to be maintained constant. Although efficiency is reduced as the voltage inputted to the inverter circuit changes in the frequency-dimming system, when such a chopper circuit is disposed, a relatively high efficiency can be maintained in a wide input-voltage range. Furthermore, since no smoothing/rectifying circuit is disposed, there is an advantage in that there is no loss in the smoothing/rectifying circuit.

In the conventional art of the above publication, the frequency of an output of an oscillator used in the chopper circuit is divided to be used as a driving frequency of the inverter circuit. Therefore, in this system, a single oscillator is required to serve as both the oscillator of the chopper circuit and that of the inverter circuit. As a result, it is necessary to integrate an integrated circuit controlling the chopper circuit and an integrated circuit controlling the inverter circuit into a single integrated circuit.

However, when actually designed, there are an application in which the input-voltage range greatly changes and an application in which a constant input voltage is supplied. In addition, more freedom in designing can be obtained and component cost can be reduced, when a chopper circuit is independent from an inverter circuit. Furthermore, in this case, it is possible to reduce power consumption by using an inexpensive bipolar PWM IC with a high input withstand voltage for the chopper circuit and a CMOS-IC with a low withstand voltage (approximately 7V) and small power consumption for the inverter circuit.

Thus, in the conventional art, since it is necessary to integrate the chopper circuit and the inverter circuit into a single integrated circuit, there are limitations in terms of freedom in designing, cost, and performance.

Meanwhile, Japanese Patent Application No. 10-274751 provides a system driving a chopper circuit and an inverter circuit by individual integrated circuits. When two circuits are disposed separately as individual integrated circuits, the limitations to designing seen in the above Japanese Unexamined Patent Publication No. 9-107684 can be avoided. However, in the conventional art provided in Japanese Patent Application No. 10-274751, in the chopper circuit, beats are generated by a frequency of an integer multiple of the frequency of the inverter circuit and the frequency of the chopper circuit, and the oscillation of a piezoelectric transformer causes ripples at a low beat frequency.

In other words, since the piezoelectric transformer performs voltage conversion through a mechanical oscillation, parts of the mechanical oscillation leak onto peripheral structural members such as a printed circuit board. In this situation, when the oscillation of the piezoelectric transformer ripples at a low frequency, oscillations of the peripheral structural members ripple at the same beat frequency. Thus, a low-frequency component detected by non-linear factors of the structural members, for example, chattering generated at the joints of the structural members appears, which causes the beats.

SUMMARY OF THE INVENTION

Accordingly, it is an object of the present invention to provide a piezoelectric transformer inverter capable of suppressing ripples caused by the oscillation of a piezoelectric transformer so that possibility of the occurrence of beats in the inverter can be reduced.

According to one aspect of the present invention, there is provided a piezoelectric transformer inverter, which includes an inverter circuit outputting an AC voltage to a load by using a ceramic piezoelectric transformer, and a chopper circuit disposed at a stage before the inverter circuit, the chopper circuit converting an inputted DC voltage into an intermittent rectangular-wave voltage according to a driving frequency higher than that of the inverter circuit and making an average voltage of the rectangular-wave voltage lower than the inputted DC voltage to apply to the inverter circuit. In this piezoelectric transformer inverter, a frequency of n times the driving frequency of the inverter circuit and a driving frequency of the chopper circuit are set in such a manner that these frequencies are not close to each other. The symbol n is an integer equal to or greater than 2.

According to another aspect of the present invention, there is provided a piezoelectric transformer inverter, which includes an inverter circuit outputting an AC voltage to a load by using a ceramic piezoelectric transformer, and a step-down chopper circuit having a switching element disposed at a stage before the inverter circuit, a current-circulating element connected between the output of the switching element and a reference potential, and a chopper-duty control unit controlling in such a manner that the value of an average voltage of a rectangular-wave voltage of the switching element is set to be a desired constant or variable value according to a driving frequency higher than that of the inverter circuit. In this piezoelectric transformer inverter, a frequency of n times the driving frequency of the inverter circuit and a driving frequency of the chopper circuit are set in such a manner that these frequencies are not close to each other. In this case, similarly, the symbol n is an integer equal to or greater than 2.

Furthermore, in one of the above-described piezoelectric transformer inverters, the absolute value of the difference between the frequency of an integer multiple of the driving frequency of the inverter circuit and the driving frequency of the chopper circuit may be 10 kHz or greater.

Furthermore, in one of the above three piezoelectric transformer inverters, the inverter circuit and the chopper circuit may be driven by different integrated circuits.

DESCRIPTION OF THE PREFERRED EMBODIMENTS

Figure 1:
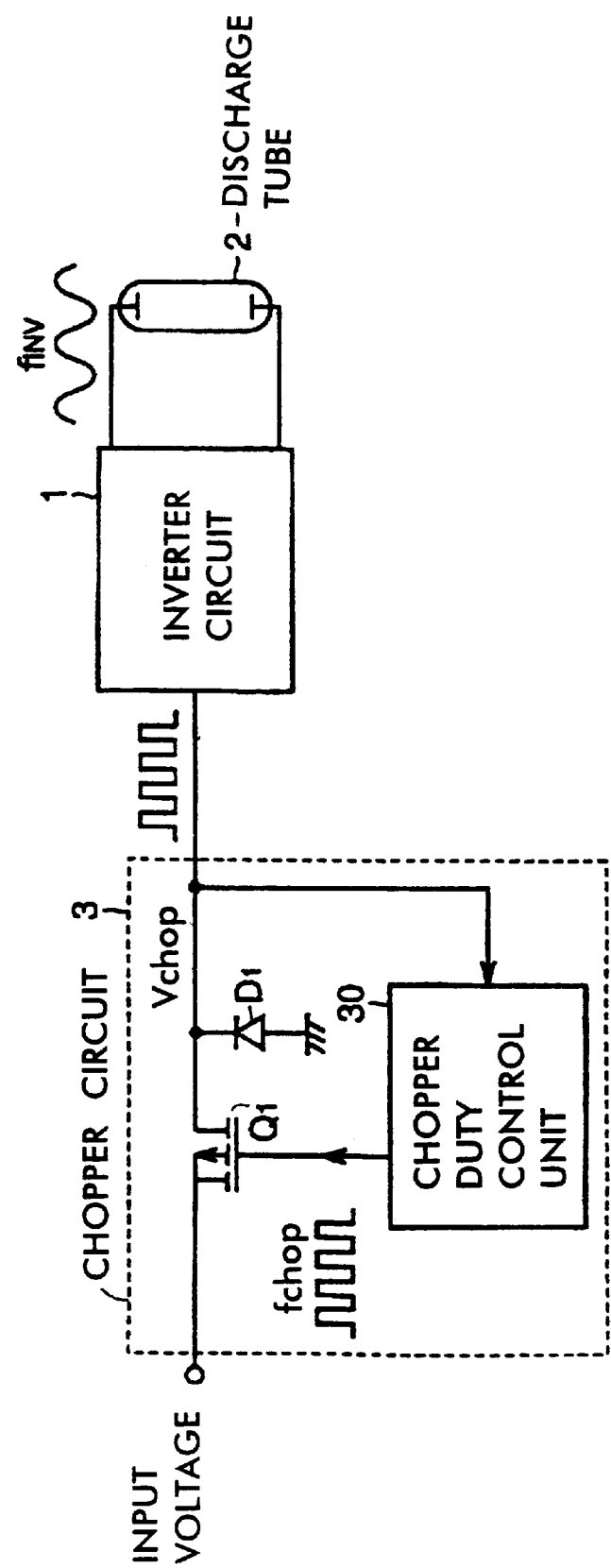
FIG. 1 is a schematic block diagram of a piezoelectric transformer inverter according to an embodiment of the present invention.

FIG. 1 shows a schematic block diagram of a piezoelectric transformer inverter of an embodiment of the present invention. In this figure, an inverter circuit 1 drives a discharge tube 2. A chopper circuit 3 is disposed at a stage before the inverter circuit 1. The chopper circuit 3 is constituted of a switching element Q1 receiving an input voltage and applying a chopper voltage to the inverter circuit 1, a current-circulating element D1 connected between the output of the switching element Q1 and a ground as a reference voltage, and a chopper-duty unit 30 for controlling in such a manner that the value of an average voltage of a rectangular-wave voltage of the switching element Q1 is a desired value.

The output of the chopper circuit 3 has a chopper-unit frequency, that is, the frequency of the on-off operation of the switching element Q1, which is indicated by the symbol $f_{chop}$. In this case, the crest value of the frequency represents a rectangular wave pulse equal to an input voltage. The inverter circuit 1 contains a piezoelectric transformer, in which an AC pulse voltage inputted from the chopper circuit generates an AC voltage of a substantially sine wave of a frequency ($f_{INV}$), which lights the discharge tube 2. The frequency $f_{chop}$ is set to be higher than the frequency $f_{INV}$.

In the example shown in FIG. 1, since the frequency $f_{chop}$ of the chopper circuit 3 is out of sync with the frequency $f_{INV}$ of the inverter circuit 1, a beat frequency is generated by both frequencies. The beat frequency can be shown by an expression $|f_{chop}-f_{INV} \times n|$. In this case, the symbol n is an integer equal to or greater than 2. The beat frequency performs AM modulation of the oscillation of the piezoelectric transformer.

However, when the beat frequency is set to be a sufficiently high frequency, the frequency turns to be inaudible. Thus, the problem of noise can be avoided.

Figure 2:
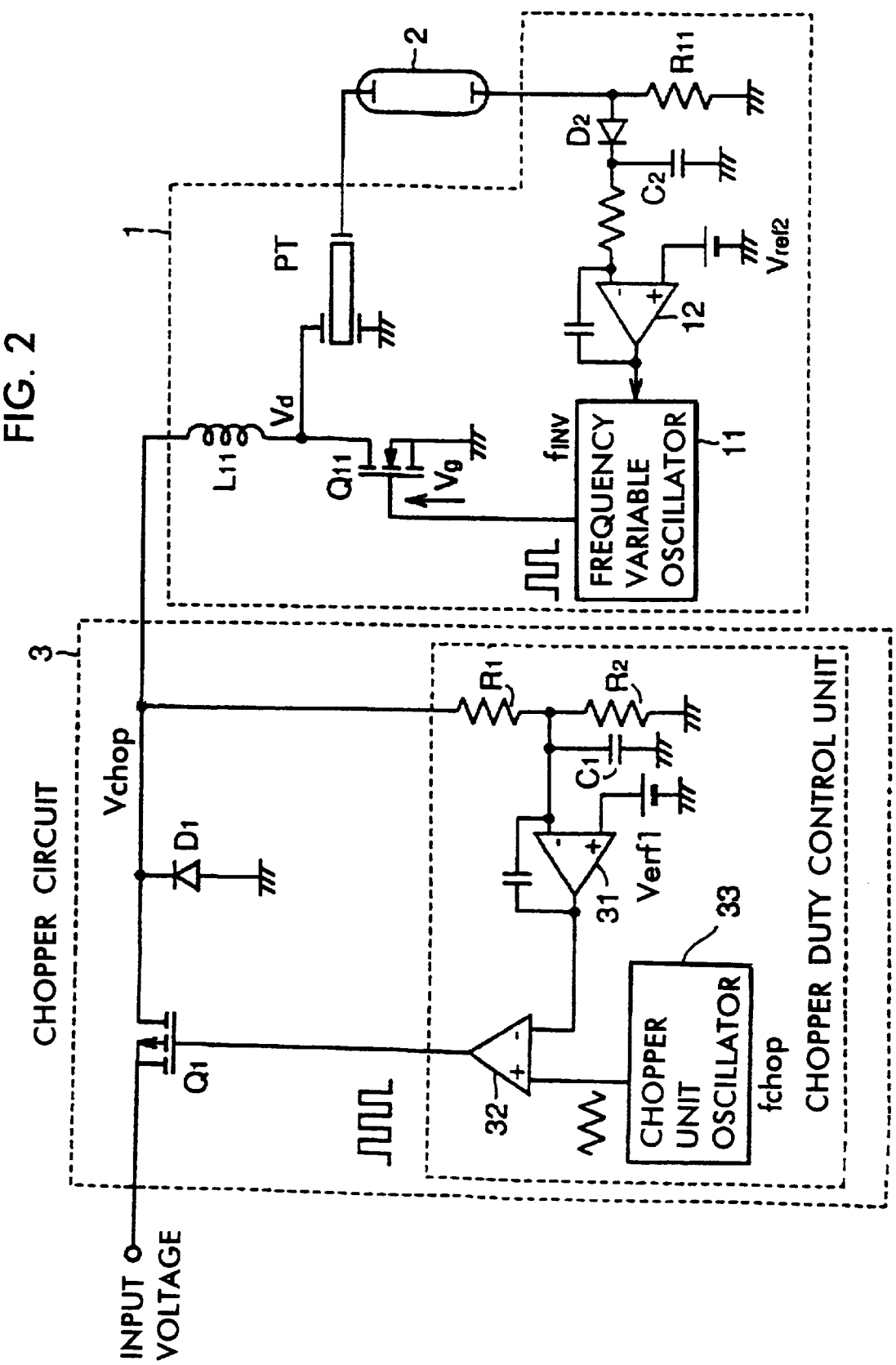
FIG. 2 is a more detailed circuit diagram of the piezoelectric transformer inverter shown in FIG. 1.

FIG. 2 is the more detailed circuit diagram of the piezoelectric transformer inverter shown in FIG. 1. In FIG. 2, an input voltage is applied to a switching element Q1 of a chopper circuit 3. The switching element Q1 is switched on and off by a switching signal supplied from a chopper-duty control unit 30, and the input voltage is converted into a rectangular-wave AC voltage $V_{chop}$. A free-wheeling diode D1 as a current-circulating element is connected between the output of the switching element Q1 and a ground. The rectangular-wave AC voltage $V_{chop}$ is divided by resistors R1 and R2 connected in series, and is smoothed by a capacitor C1 to be applied to the inverting-input terminal of a comparator 31.

A reference voltage $V_{ref1}$ is applied to the non-inverting-input terminal of the comparator 31, and the output of the comparator 31 is applied to the inverting-input terminal of a comparator 32. The output of a chopper-unit oscillator 33 outputting a triangular wave having a $f_{chop}$ frequency is applied to the non-inverting-input terminal of the comparator 32. The comparator 32 drives the above switching element Q1 by the output.

In addition, the rectangular-wave AC voltage $V_{chop}$ is applied to one end of a coil L11 of an inverter circuit 1. The other end of the coil L11 is connected to a switching element Q11 and a piezoelectric transformer PT. The piezoelectric transformer PT drives a discharge tube 2, and the discharge-tube current is detected via a resistor R11 and is rectified by a diode D2 and a capacitor C2 to be applied to the inverting-input terminal of a comparator 12. The comparator 12 compares the rectified signal with a reference voltage $_{ref2}$. The output of the comparator 12 is applied to a frequency variable oscillator 11. The frequency variable oscillator 11 drives the switching element Q11 at a frequency $f_{INV}$.

A description will be given of the detailed operation of the piezoelectric transformer shown in FIG. 2. It is known that the piezoelectric transformer PT exhibits a good efficiency when the transformer PT is operated at a frequency higher than the resonant frequency thereof. This embodiment uses a region in which the good efficiency is obtained, that is, a region in which the boosting ratio of the piezoelectric transformer PT is reduced when the frequency is higher.

When it is assumed that a tube-current value is greater than a targeted value due to a certain external disturbance, a voltage generated at each end of the resistor 11 and the capacitor 2 of the inverter circuit 1 is also increased. As a result, when the voltage of the comparator 12 becomes larger than the reference voltage $_{ref2}$, the output of the comparator 12 is reduced. In this case, when it is assumed that the frequency variable oscillator 11 is designed in such a manner that, when an input voltage to the oscillator 11 is reduced, the frequency is increased, the frequency variable oscillator 11 permits the frequency to be changed so as to increase the frequency $f_{INV}$. With this arrangement, the boosting ratio of the piezoelectric transformer PT is reduced, and then the tube current is also reduced. As a result, control is exercised in a direction in which the initial external change is suppressed.

In this way, in the inverter of the above embodiment, although the frequency thereof slightly fluctuates depending on the ambient environment, since the piezoelectric transformer PT has steep resonant characteristics, the width of frequency fluctuations is very small. Thus, it can be considered that the transformer inverter is operated at an approximately constant frequency $f_{INV}$.

The chopper circuit 3 controls an average voltage of the output so as to maintain constant, even though the input voltage fluctuates. When it is now assumed that the chopper output is increased due to an external disturbance, since the inverting input of the comparator 31 is increased, the output of the comparator 31 is reduced. Since the chopper-unit oscillator 33 outputs the frequency $f_{chop}$ triangular waveform, reduction of the output of the comparator 31 permits a ratio in which the output of the comparator 32 is at high level to be increased. In other words, the on-duty ratio of the switching element Q1 becomes small, and control is exercised so as to minimize the initial external disturbance. As seen here, with the use of the chopper circuit 3, the average input voltage of the inverter circuit 1 can be maintained constant, and the inverter can be driven near a frequency at which the efficiency of the piezoelectric transformer PT is at its peak.

Figure 3A:
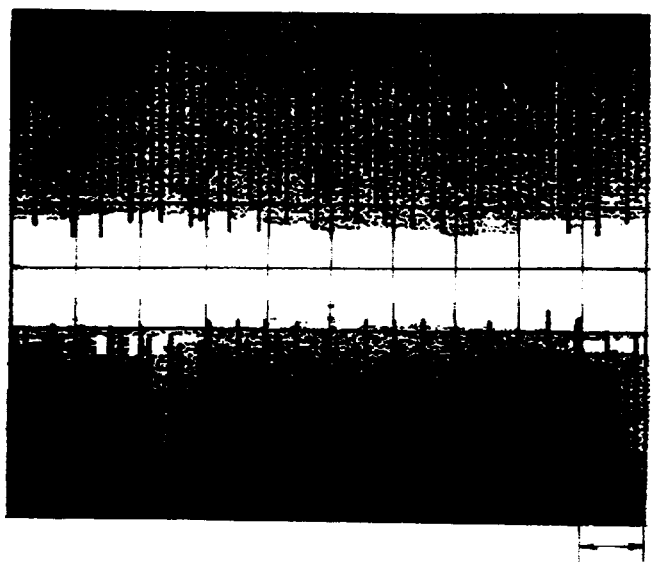
FIGS. 3A, 3B, and 3C are views of tube-current waveforms obtained when a chopper frequency $f_{chop}$ is changed in the piezoelectric transformer inverter shown in FIG. 2.
Figure 3B:
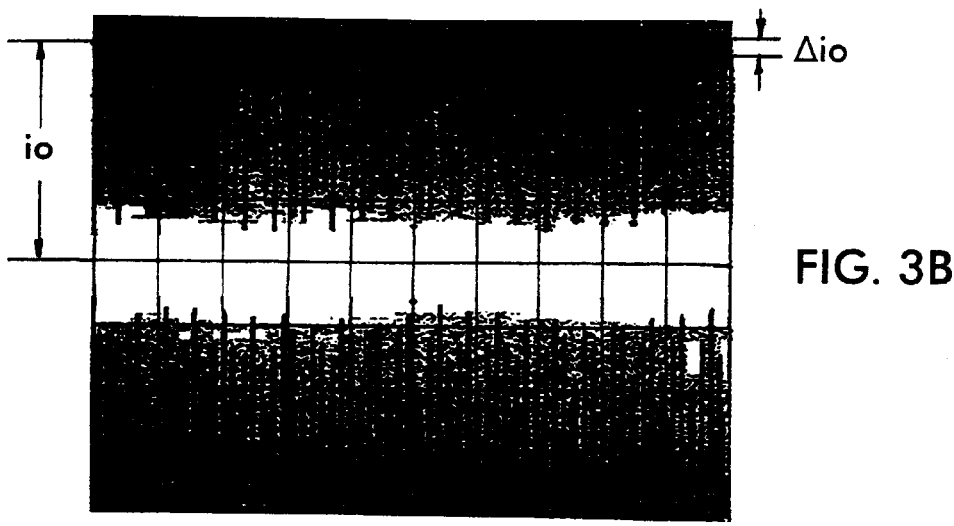
Figure 3C:
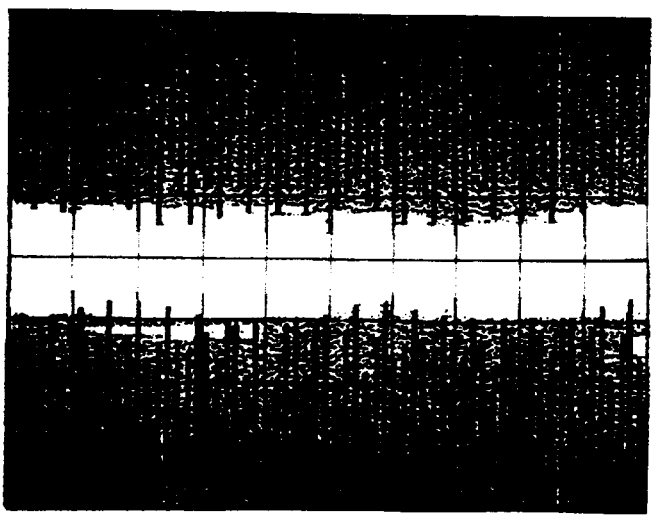

FIGS. 3A to 3C are tube-current waveforms of the piezoelectric transformer inverter shown in FIG. 2, obtained when the frequency $f_{INV}$ is set to be 56.4 kHz, and the frequency $f_{chop}$ is changed. In FIG. 3A, the frequency $f_{chop}$ is set to be 170.6 kHz; in FIG. 3B, the frequency $f_{chop}$ is set to be 171.9 kHz; and in FIG. 3C, the frequency $f_{chop}$ is set to be 173.2 kHz. As evident in FIGS. 3A to 3C, beats occur due to ripples caused by the oscillation of the piezoelectric transformer PT, and the ripples of the tube current occurs due to the ripples of the piezoelectric transformer PT. Thus, the measurement of the ripples of the tube current is equivalent to the indirect measurement of the ripples caused by the oscillation of the piezoelectric transformer PT.

In FIGS. 3A to 3C, it is found that, when the frequency $f_{chop}$ is changed, the cycles of the ripples, which are equal to the cycles of beats, and the amplitudes of the ripples ($\Delta io$) change.

Figure 4A:
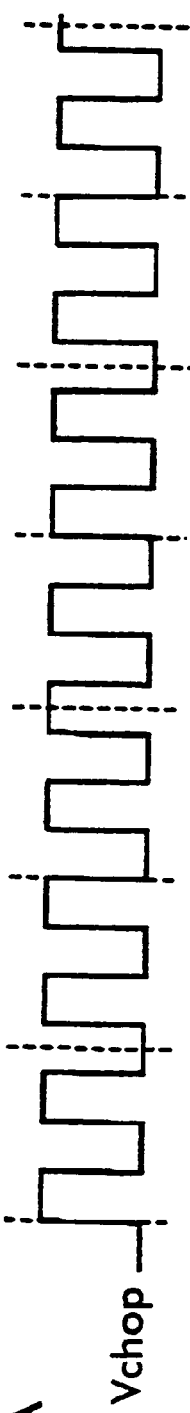
FIGS. 4A, 4B, and 4C are views of waveforms for illustrating the mechanism of beats.
Figure 4B:
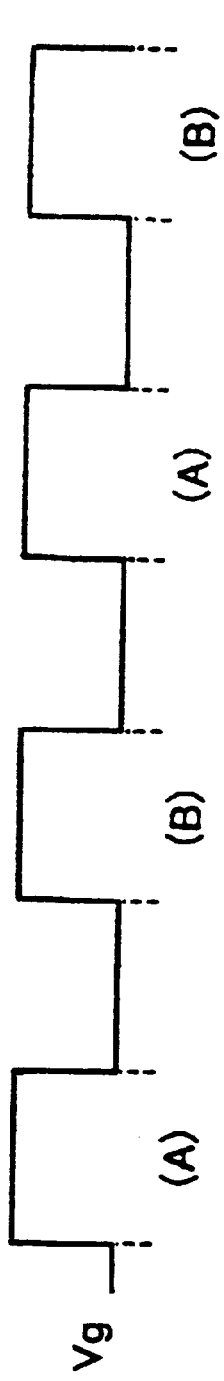
Figure 4C:
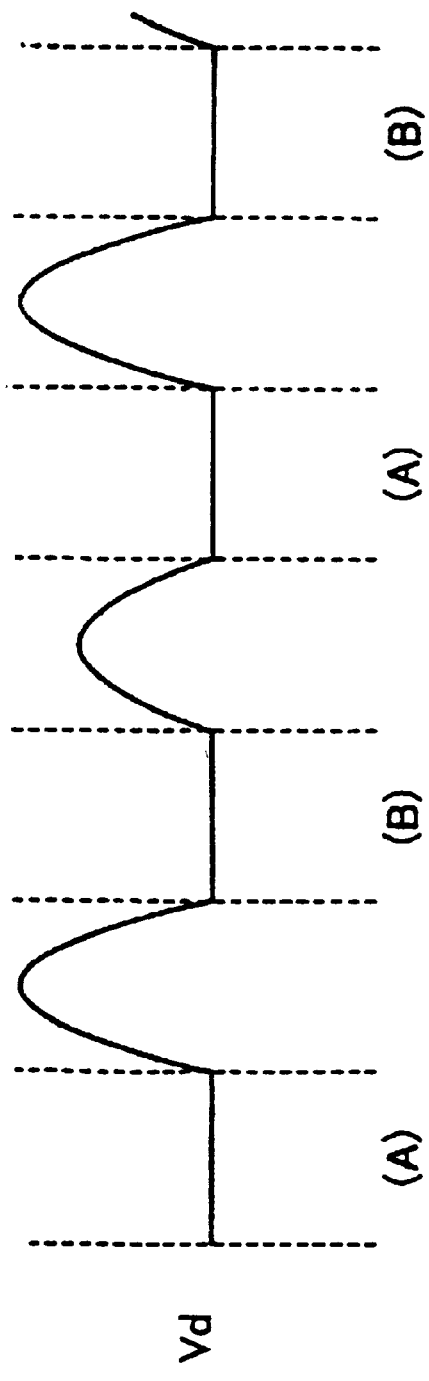

FIGS. 4A to 4C each show a waveform for illustrating the mechanism of beats at each part in the piezoelectric transformer inverter shown in FIG. 2. FIG. 4A indicates the waveform of a chopper-circuit output $V_{chop}$, FIG. 4B indicates the waveform of a gate voltage $V_g$ of the switching element Q11 in the inverter circuit 1, and FIG. 4C indicates the waveform of a drain voltage $V_d$ of the switching element Q11. During a period in which the gate voltage $V_g$ is at high level, the switching element Q11 stores a pulse energy supplied from the chopper circuit 3 in the coil L11, and during a period in which the gate voltage $V_g$ is at low level, that is, during a period in which the switching element Q11 is switched off, the switching element Q11 flies back the stored energy to the piezoelectric transformer PT. In the structure shown in FIG. 2, since the coil L11 and the input capacitance of the piezoelectric transformer PT makes a resonance waveforms so as to perform zero-volt switching, a good efficiency can be obtained. As a result, the circuit structure shown in FIG. 2 is generally used for a drive circuit of the class "semi-E" operation.

FIGS. 4A to 4C show examples obtained when the chopper-circuit frequency $f_{chop}$ is obtained by multiplying $f_{INV}$ by 3.5. In the period (A), since two pulses of the chopper-circuit output $V_{chop}$ are inputted during the period in which the switching element Q11 is in an on-state, the amount of energy equivalent to the two pulses is stored in the coil L11. However, in the period (B), since only 1.5 pulse of the chopper circuit output $V_{chop}$ is inputted, the energy stored in the coil L11 is smaller than that in the period (A). As a result, in the drain voltage $V_d$ of the switching element Q11, as shown in FIG. 4C, the crest value of the voltage changes at every wave, and beats occur. When the beats occur in the drain voltage $V_d$ of the switching element Q11 as the input voltage to the piezoelectric transformer, the beat components are naturally superimposed on the transformer oscillation excited by the beats.

Figure 5:
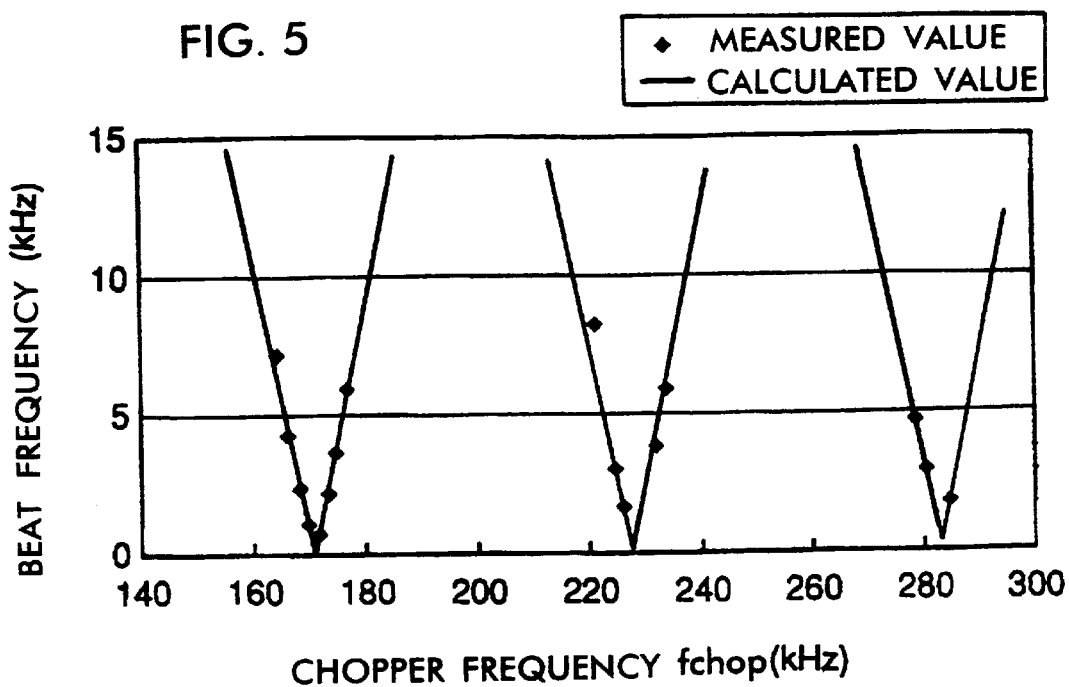
FIG. 5 is a view for illustrating the relationships between chopper frequencies and beat frequencies.
Figure 6:
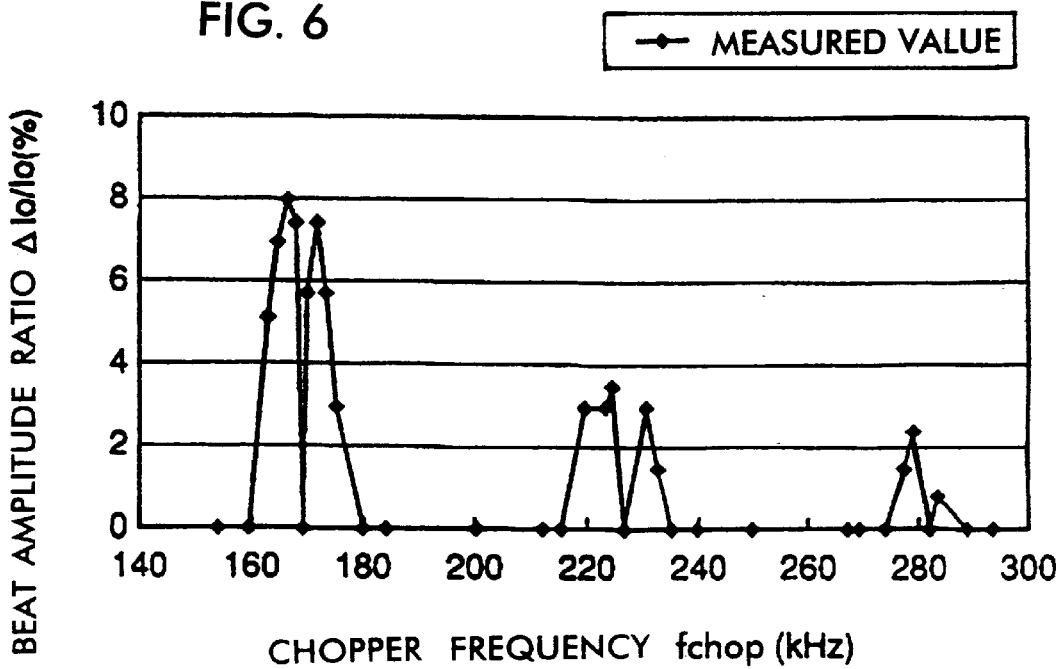
FIG. 6 is a view illustrating the relationships between chopper frequencies and beat amplitude ratios.

FIG. 5 shows the relationships between chopper frequencies and beat frequencies, and FIG. 6 shows the relationships between chopper frequencies and beat amplitude ratios.

In FIG. 5, the calculated values were obtained by using an expression $|f_{chop}-f_{INV} \times n|$, in which the symbol n is an integer equal to or greater than 2. As seen here, it is evident that the ripple of the tube current, and, consequently, the ripple of the transformer oscillation are caused by beats occurring due to the chopper frequency $f_{chop}$ and the inverter circuit frequency $f_{INV}$. When the span between the beat frequencies is set to be 10 kHz or more, it is found that the beat amplitude ratio can be sufficiently made small. That is, in this embodiment, when the chopper circuit frequency $f_{chop}$ is set to be frequencies of "the window of beats", such as the frequencies of 180 to 215 kHz, or the frequencies of 236 to 272 kHz, the occurrence of beats can be practically suppressed.

In this case, although no beats occur when the beat frequency is 0 kHz, it is very difficult to coincide the chopper circuit frequency $f_{chop}$ with a frequency of an integer multiple of the inverter circuit frequency $f_{INV}$ with precision, and in fact, it is not realistic.

Next, when assuming that this embodiment is applied to an inverter used in a notebook-type personal computer, three lithium cells are generally used in such a type of computer, in which a specified input voltage is usually in a range of approximately 7 to 20 V. As a result, in this case, a chopper-duty control unit 30 driving a switching element Q1 is required to have a withstand voltage of 20 V or more so as to output a driving signal of 7 to 20 V.

Meanwhile, since an inverter circuit 1 only serves to drive a switching element Q11, it is possible to drive it with a voltage of approximately 3 to 5 V. That is, for example, when an integrated circuit using high pressure bipolar process is used for the chopper-duty control unit 30, and an integrated circuit using the CMOS process of a withstand voltage lower than 7 V is used for the inverter circuit 1, the overall efficiency in the inverter including the control-unit power consumption can be improved.

Figure 7:
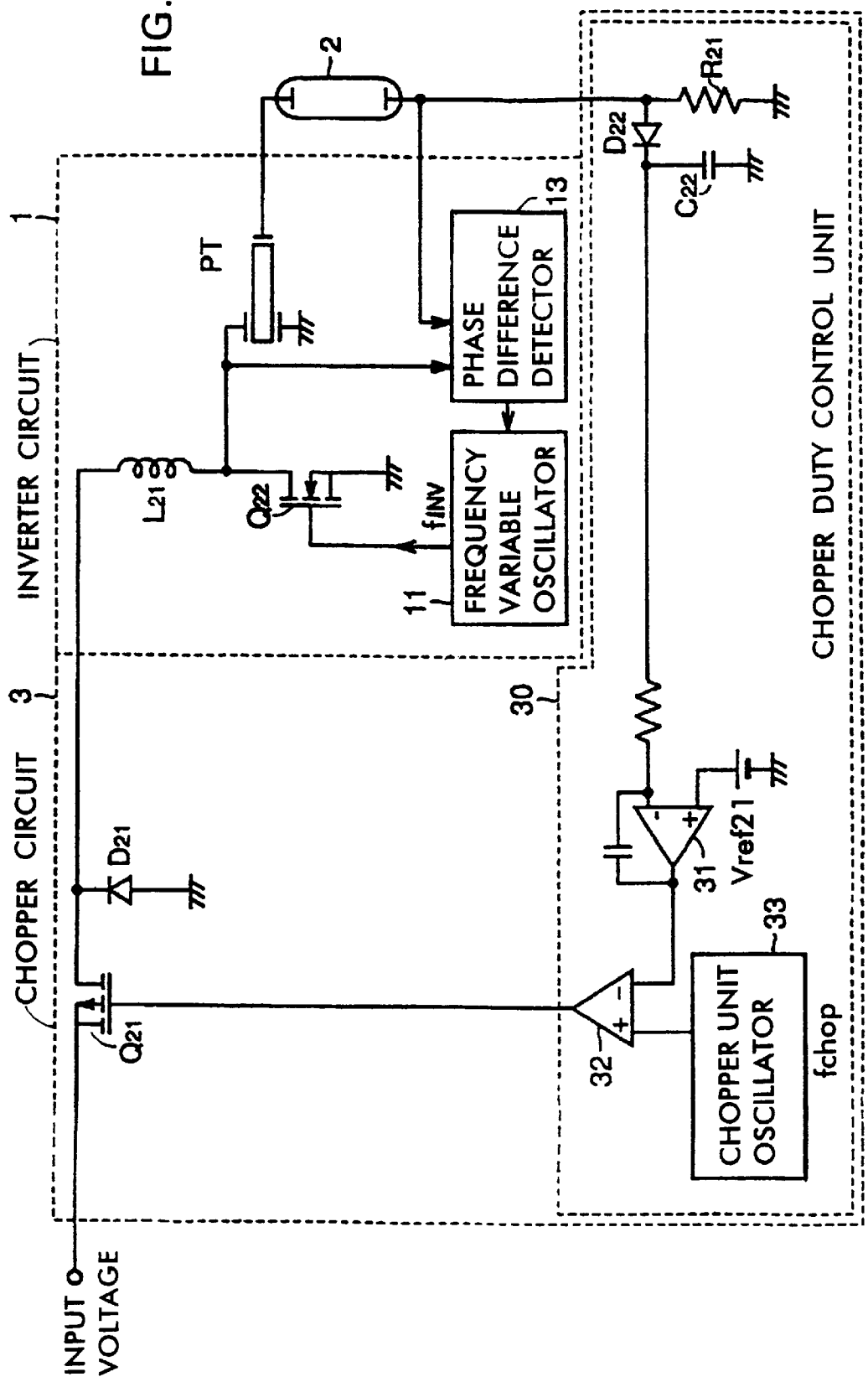
FIG. 7 is a circuit diagram of a piezoelectric transformer inverter according to another embodiment of the present invention.

FIG. 7 is a circuit diagram of a piezoelectric transformer inverter according to another embodiment of the present invention. In this figure, the feedback of a discharge-tube current to an inverter circuit 1 is performed, and the feedback thereof to a chopper-duty control unit 30 is also performed. More specifically, an input voltage is applied to a switching element Q21 of a chopper circuit 3, by which the switching element Q21 is switched on and off, and then, the input voltage is converted into a rectangular-wave AC voltage $V_{chop}$ to be applied to one end of a coil L21 of the inverter circuit 1.

Furthermore, a free-wheeling diode D21 provided for current circulation is connected between the output terminal of the switching element Q21 and a ground. The other end of the coil L21 is connected to the switching element Q21 and a piezoelectric transformer PT, respectively. The piezoelectric transformer PT drives a discharge tube 2. The discharge-tube current flows through a resistor R21, and the voltage is rectified by a diode 22 and a capacitor C22, respectively, to be applied to the inverting-input terminal of a comparator 31 and to a phase difference detector 13. A reference voltage $V_{ref}$ 21 is applied to the non-inverting-input terminal of the comparator 31, which compares both voltages and applies an output to the inverting-input terminal of a comparator 32. A triangular wave of the chopper circuit frequency $f_{chop}$ is applied to the non-inverting-input terminal of the comparator 32 from a chopper-unit oscillator 33. The comparator 32 compares both voltages to drive the switching element Q21 with the output thereof.

In the inverter circuit 1, the phase difference between the input voltage and output current of the piezoelectric transformer PT is detected by the phase difference detector 13. The output detected by the phase difference detector 13 is applied to a frequency variable oscillator 11 to be controlled in such a manner that the value of the phase difference between an input signal and an output signal is maintained to be a desired value. Although the resonant frequency of the piezoelectric transformer PT changes with a load fluctuation, when the phase difference is maintained constant, the inverter circuit frequency $f_{INV}$ can be retained in proximity to the resonant frequency even though the load fluctuates.

Next, a detailed description will be given of the operation of the piezoelectric transformer inverter shown in FIG. 7. In this embodiment, the inverter circuit 1 is driven at the inverter circuit frequency $f_{INV}$ in proximity to the resonant frequency by maintaining the phase difference of the piezoelectric transformer PT constant. The chopper-duty control unit 30 detects the discharge-tube current and controls the chopper duty so as to maintain the value of the detected discharge-tube current constant.

In the aforementioned example shown in FIG. 2, the chopper circuit 3 and the inverter circuit 1 have individually controlling loops. However, in this embodiment, the feedback of the discharge-tube current to both the chopper-duty control unit 30 and the inverter circuit 1 is performed to achieve an overall control so as to maintain the tube current constant. This arrangement contributes to simplification of a control circuit system.

Similarly, in this embodiment, the absolute value of the difference between a frequency of an integer multiple of the inverter circuit frequency $f_{INV}$ and the chopper circuit frequency $f_{chop}$ is set to be 10 kHz or more. With this arrangement, the occurrence of beats due to the ripples of the transformer oscillations can be suppressed. In addition, since the inverter circuit 1 and the chopper duty unit 30 are individually formed by separate integrated circuits, a circuit structure having high efficiency and great freedom of designing can be obtained.

However, while the invention has been particularly shown and described with reference to preferred embodiments thereof, it will be understood that the invention is not limited by any of the details of description in its application. It should also be understood that various modifications may be made therein, and it is intended to cover in the appended claims all such modifications as fall within the true spirit and scope of the invention.

As described above, according to one aspect of the present invention, with the arrangement in which the frequency of n times the inverter circuit frequency is not close to the chopper circuit frequency, the ripples due to the piezoelectric transformer oscillation can be suppressed, and possibility of the occurrence of beats in the inverter can thereby be reduced.

In addition, since the absolute value of the difference between the frequency of an integer multiple of the inverter circuit frequency and the chopper frequency is set to be 10 kHz or more, the ripples of the transformer can be suppressed to be substantially eliminated, by which the problem of beats occurring in the inverter can be avoided. Furthermore, since the chopper circuit and the inverter circuit are driven by separate integrated circuits, the efficiency can be improved and the freedom of designing can be increased.

What is claimed is:

1. A piezoelectric transformer inverter comprising:

an inverter circuit outputting an AC voltage to a load by using a ceramic piezoelectric transformer; and a chopper circuit disposed at a stage before the inverter circuit, the chopper circuit converting an inputted DC voltage into an intermittent rectangular-wave voltage according to a driving frequency higher than that of the inverter circuit and making an average voltage of the rectangular-wave voltage lower than the inputted DC voltage to apply to the inverter circuit;

wherein a frequency of n times the driving frequency of the inverter circuit and a driving frequency of the chopper circuit are set in such a manner that these frequencies are not close to each other, the symbol n being an integer equal to or greater than 2.

2. A piezoelectric transformer inverter comprising:

an inverter circuit outputting an AC voltage to a load by using a ceramic piezoelectric transformer; and a step-down chopper circuit including a switching element disposed at a stage before the inverter circuit, a current-circulating element connected between the output of the switching element and a reference potential, and a chopper-duty control unit controlling in such a manner that the value of an average voltage of a rectangular-wave voltage of the switching element is set to be a desired constant or variable value according to a driving frequency higher than that of the inverter circuit;

wherein a frequency of n times the driving frequency of the inverter circuit and a driving frequency of the step-down chopper circuit are set in such a manner that these frequencies are not close to each other, the symbol n being an integer equal to or greater than 2.

3. A piezoelectric transformer inverter according to one of claims 1 and 2, wherein the absolute value of the difference between the frequency of an integer multiple of the driving frequency of the inverter circuit and the driving frequency of the chopper circuit is set to be 10 kHz or greater.

4. A piezoelectric transformer inverter according to one of claims 1 and 2, wherein the inverter circuit and the chopper circuit are driven by different integrated circuits.

5. A piezoelectric transformer inverter according to claim 3, wherein the inverter circuit and the chopper circuit are driven by different integrated circuits.

\* \* \* \* \*